United States Patent
Endo et al.

(10) Patent No.: US 6,618,641 B2
(45) Date of Patent: Sep. 9, 2003

(54) DRIVE CONTROLLER FOR MACHINE TOOL

(75) Inventors: Nobuyuki Endo, Shizuoka (JP); Shigeyuki Kurihara, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 09/913,647

(22) PCT Filed: Nov. 30, 2000

(86) PCT No.: PCT/JP00/08469
§ 371 (c)(1),
(2), (4) Date: Aug. 17, 2001

(87) PCT Pub. No.: WO01/43914
PCT Pub. Date: Jun. 21, 2001

(65) Prior Publication Data
US 2002/0158597 A1 Oct. 31, 2002

(30) Foreign Application Priority Data
Dec. 17, 1999 (JP) .......................................... 11-359316

(51) Int. Cl.⁷ ............................................... G06F 19/00
(52) U.S. Cl. ........................ 700/159; 700/183; 318/560
(58) Field of Search ........................ 700/159, 183–184, 700/187–190, 193; 318/560, 568.1

(56) References Cited

U.S. PATENT DOCUMENTS

| | | | | | |
|---|---|---|---|---|---|
| 4,817,007 | A | * | 3/1989 | New ........................... | 700/159 |
| 5,072,399 | A | * | 12/1991 | Laws et al. ................. | 700/187 |
| 5,545,959 | A | * | 8/1996 | Otsuki et al. ........... | 318/568.15 |
| 5,600,221 | A | * | 2/1997 | Tomatsuri et al. .......... | 318/632 |
| 5,883,482 | A | * | 3/1999 | Hocht et al. ................. | 318/561 |
| 5,914,880 | A | * | 6/1999 | Yasojima et al. ........... | 700/159 |
| 5,923,132 | A | * | 7/1999 | Boyer .......................... | 318/34 |
| 6,133,705 | A | * | 10/2000 | Inoue et al. ................. | 318/632 |

FOREIGN PATENT DOCUMENTS

| | | |
|---|---|---|
| JP | 52-27975 | 3/1977 |
| JP | 3-296109 | 12/1991 |
| JP | 5-189018 | 7/1993 |
| JP | 6-110532 | 4/1994 |
| JP | 8-123520 | 5/1996 |

\* cited by examiner

*Primary Examiner*—Albert W. Paladini
*Assistant Examiner*—Zoila Cabrera
(74) *Attorney, Agent, or Firm*—Morgan, Lewis & Bockius LLP

(57) ABSTRACT

Each time the number of cumulative rotations of a spindle rotating motor 11 reaches the number of cumulative rotations set in a position data table T, a CPU 22 reads out the mobile positions of a work piece and tool at thus reached number of cumulative rotations and the next number of cumulative rotations to reach from a position data storage section 25, and reads out a moving speed characteristic between the reached number of cumulative rotations and the next number of cumulative rotations to reach from a moving speed characteristic storage section 27 according to an auxiliary operation designation in the position data table T. Thereafter, assuming the reached number of cumulative rotations to be a start point and the next number of cumulative is rotations to reach to be an end point, the CPU 22 divides the part between the start and end points into predetermined timings, and defines the mobile positions of the workpiece and tool at each of the divided timings according to the read-out mobile positions of the workpiece and tool and moving speed characteristic.

6 Claims, 9 Drawing Sheets

| NUMBER OF CUMULATIVE ROTATIONS ($\theta$) | MOBILE POSITION OF WORAKPIECE (Zp) | MOBILE POSITION OF TOOL (Xp) | AUXILIARY OPERATION DESIGNATION |
|---|---|---|---|
| ⋮ | ⋮ | ⋮ | ⋮ |
| 200 | 1 | 2 | |
| 350 | 3 | 2 | |
| 600 | 7 | 4 | |
| ⋮ | ⋮ | ⋮ | ⋮ |

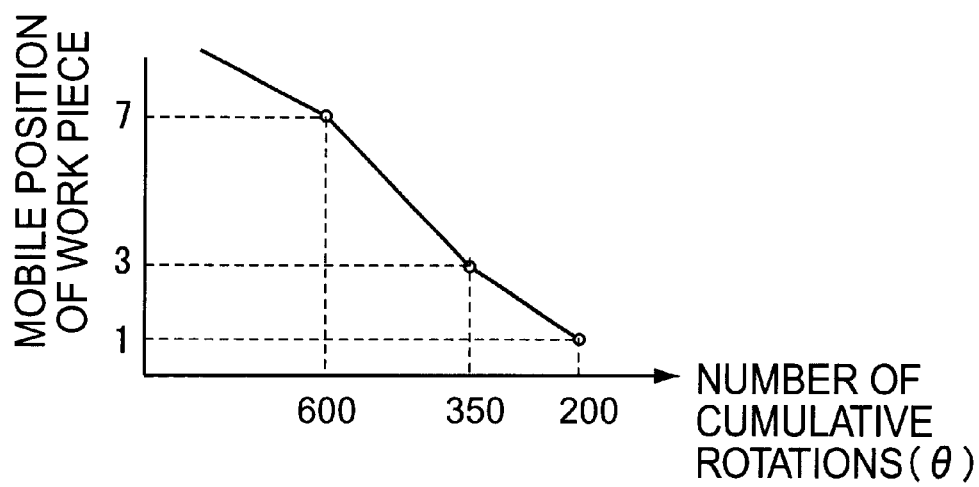
Fig.8A
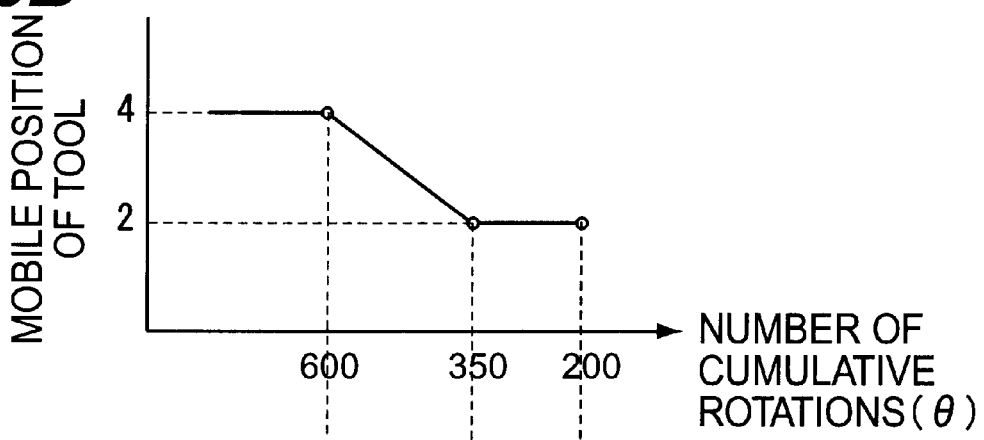
Fig.8B
Fig.8C
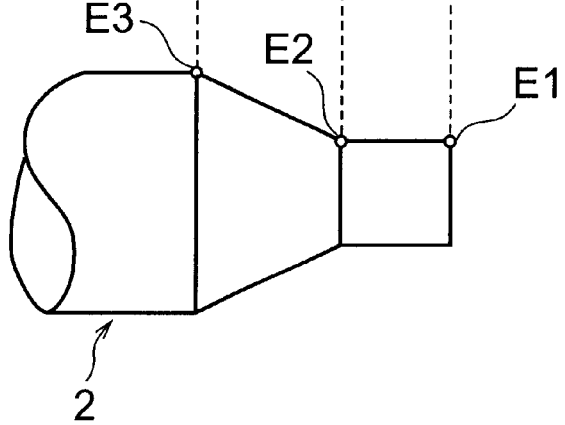

DRIVE CONTROLLER FOR MACHINE TOOL

TECHNICAL FIELD

The present invention relates to a drive control apparatus for a machine tool which rotates a workpiece about a predetermined axis and moves at least one of the workpiece and a tool for machining the workpiece so as to machine the workpiece into a desirable form.

BACKGROUND ART

Known as a drive control apparatus for the machine tool of this kind is one disclosed in Japanese Patent Application Laid-Open No. HEI 3-296109, for example. The drive control apparatus disclosed in Japanese Patent application Laid-Open No. HEI 3-296109 is one in which the drive control for a machine tool conventionally controlled by a cam, which is a mechanical element, is made electronic; and comprises a pulse encoder attached to a rotary object, rotary position storage means for reading out pulse signals outputted from the pulse encoder and storing rotary position data at each point in time, and command position storage means for storing command position data of a mobile axis set in response to each unit rotational position of the rotary object. As a consequence, the drive control apparatus generates movement command data on the mobile axis at each point in time from the above-mentioned rotary position data and command position data, and generates command speed data on the mobile axis synchronous to the rotational speed of the rotary object from the movement command data and the rotary position data, thereby controlling the position of a tool according to thus generated movement command data and command speed data.

Also known as a drive control apparatus for a similar machine tool is one disclosed in Japanese Patent Application Laid-Open No. HEI 5-189018, for example. The drive control apparatus for a machine tool disclosed in Japanese Patent Application Laid-Open No. HEI 5-189018 comprises cam phase arithmetic means for calculating a cam phase of a cam shaft at a given time, adjustment phase adding means for adding an adjustment phase to the cam phase so as to determine an adjusted cam phase, a cam curve memory for storing a cam curve, position reference means for calculating an axis position corresponding to the adjusted cam phase by referring to the cam curve memory, movement ratio multiplying means for multiplying the axis position by a movement ratio so as to determine a proportioned position, and adjustment movement quantity adding means for adding an adjustment movement quantity to the proportioned position so as to determine a final command position. As a consequence, the drive control means controls the position of a tool according to the final command position determined by the adjustment movement quantity adding means.

DISCLOSURE OF THE INVENTION

In a drive control apparatus such as the one disclosed in Japanese Patent Application Laid-Open No. HEI 3-296109, however, it is necessary for a memory such as RAM acting as the command position storage means to store the respective command position data of the mobile axis set so as to correspond to the individual unit rotational positions, i.e., all of a lot of position data concerning a desirable machining form, which increases the storage capacity of the memory. Also, for improving the accuracy in machining of the workpiece with the tool, it is necessary to finely set the above-mentioned unit rotational position so as to further enhance the number of position data, which greatly increases the storage capacity as well.

In a drive control apparatus such as the one disclosed in Japanese Patent Application Laid-Open No. HEI 5-189018, on the other hand, the cam position (radius) indicative of the form of the cam as a mechanical element is simply stored as a table of the cam phase and cam position into a memory (cam curve memory). Therefore, it is necessary to carry out arithmetic operations for taking account of a link mechanism between the cam and the tool (bite), a length adjustment mechanism for the tool (bite), and the like, so as to determine the mobile position of the tool from the cam position (radius) stored in the memory (cam curve memory). Though cam phases are set at predetermined irregular intervals in the above-mentioned table, cam positions are determined by proportionally distributing the cam position corresponding to the (m−1)-th cam phase and the cam position corresponding to the m-th cam phase between the (m−1)-th cam phase and the m-th cam phase, whereby the moving speed of the tool cannot be changed between the (m−1)-th cam phase and the m-th cam phase, which imposes a limit to increasing the accuracy in machining the workpiece with the tool.

In view of the points mentioned above, it is an object of the present invention to provide a drive control apparatus for a machine tool, which can improve the accuracy in machining the workpiece with the tool without increasing the storage capacity for position data.

In order to achieve the above-mentioned object, the present invention provides a drive control apparatus for a machine tool for machining a workpiece into a desirable form by rotating the workpiece about a predetermined axis and moving at least one of the workpiece and a tool for machining the workpiece; the apparatus comprising reference timing signal generating means for generating a reference timing signal at each predetermined rotational angle in the predetermined axis; reference timing signal count means for counting the number of occurrences of the reference timing signal; position data storage means for storing position data respectively set so as to correspond to a plurality of different count values of the number of occurrences, the position data indicating a mobile position of at least one of the workpiece and tool; moving speed characteristic storage means for storing a moving speed characteristic of at least one of the workpiece and tool between two points in the position data; and mobile position defining means for reading out, each time the number of occurrences of the reference timing signal counted by the reference timing signal count means reaches the count value, position data corresponding to the reached count data and a next count data to reach from the position data storage means, and a moving speed characteristic corresponding to a part between the reached count value and the next count value to reach from the moving speed characteristic storage means, dividing the part between the reached count value and the next count value to reach into predetermined timings, and defining a mobile position of at least one of the workpiece and tool at each of the divided timings according to the read-out position data and moving speed characteristic; wherein at least one of the workpiece and tool is moved according to the mobile position defined by the mobile position defining means.

The drive control apparatus for a machine tool in accordance with the present invention comprises reference timing signal generating means, reference timing signal count means, position data storage means, moving speed characteristic storage means, and mobile position defining means.

In particular, each time the number of occurrences of the reference timing signal counted by the reference timing signal count means reaches a count value, the mobile position defining means reads out position data corresponding to the reached count value and the next count value to reach from the position data storage means, reads out a moving speed characteristic corresponding to the part between the reached count value and the next count value to reach from the moving speed characteristic storage means, and divides the part between the reached count value and the next count value to reach into predetermined timings, so as to define the mobile position of at least one of the workpiece and tool at each timing according to the read-out position data and moving speed characteristic. Therefore, taking the reached count value and next count value to reach as start and end points, respectively, the machining form corresponding to the part between the start and end points is approximated as a linear segment. Consequently, it is sufficient for the position data storage means to store position data corresponding to the above-mentioned start point (reached count value) and end point (next count value to reach), which makes it unnecessary to store all of a lot of position data concerning the machining form. As a result, the storage capacity for position data in the position data storage means can be cut down greatly.

The position data storage means stores position data indicative of the mobile position of at least one of the workpiece and tool. As a consequence, arithmetic operations for taking account of the link mechanism, length adjustment mechanism, and the like become unnecessary, whereby the mobile position of at least one of the workpiece and tool at each of the divided timings can be defined rapidly.

Further, in the drive control apparatus for a machine tool in accordance with the present invention, the machining form corresponding to the part between the start and end points is approximated as a linear segment, and the moving speed of at least one of the workpiece and tool in the linear segment is controlled according to the moving speed characteristic stored in the moving speed characteristic storage means. Therefore, when machining a portion corresponding to the part between the start point (reached count value) and the end point (next count value to reach) in the workpiece, the moving speed of at least one of the workpiece and tool can be changed appropriately according to the moving speed characteristic. As a result, the accuracy in machining the workpiece with the tool can be improved.

In view of the foregoing, the drive control apparatus for a machine tool in accordance with the present invention can realize a drive control apparatus for a machine tool, which can improve the accuracy in machining the workpiece with the tool without increasing the storage capacity for position data.

In the drive control apparatus for a machine tool in accordance with the present invention, the machine tool may comprise a drive motor section for moving at least one of the workpiece and tool, whereas the mobile position defining means may sequentially output the defined mobile position as command data to the drive motor section in response to rotation of the predetermined axis.

Even in the case where a fluctuation occurs in rotation of a predetermined axis, a mobile position defined in the state additionally taking account of the fluctuation in rotation will be outputted as command data to the drive motor section if the mobile position defining means sequentially outputs the defined mobile position as the command data to the drive motor section in response to the rotation of the predetermined axis. As a result, the accuracy in machining the workpiece with the tool can further be improved.

In the drive control apparatus for a machine tool in accordance with the present invention, the machine tool may comprise a drive motor section for moving at least one of the workpiece and tool, whereas the mobile position defining means may sequentially output the defined mobile position as command data to the drive motor section at divided timings.

When the mobile position defining means sequentially outputs the defined mobile position as command data to the drive motor section at divided timings, a configuration capable of outputting the defined mobile position as command data to the drive motor section can be realized in a quite simple fashion.

In the drive control apparatus for a machine tool in accordance with the present invention, the count value may be defined such that the position data set so as to correspond to the count value represents the mobile position at a position where a machining form is changed such as a point of inflexion, a corner part, and a curvature changing point in the desirable form.

When the count value is defined such that the position data set so as to correspond to the count value represents the mobile position at a position where a machining form is changed such as a point of inflexion, a corner part, and a curvature changing point in the desirable form, the linear part in the machining form of the workpiece is restrained from being divided, whereby a position where a machining form is changed such as a point of inflexion, a corner part, and a curvature changing point in the desirable form is set as a start or end point. As a result, the storage capacity for position data in the position data storage means can be cut down more greatly.

In the drive control apparatus for a machine tool in accordance with the present invention, the count value may be defined so as to represent the mobile position at a dividing position where a curved part in the desirable form is divided.

When the count value is defined so as to represent the mobile position at a dividing position where a curved part in the desirable form is divided, the machining form corresponding to the part between the start and end points can be approximated as a linear segment even if a curved part exists in the machining form of the workpiece. As a result, the workpiece can be machined favorably even in the curved part without sacrificing the machining accuracy.

In the drive control apparatus for a machine tool in accordance with the present invention, the moving speed characteristic may be set so as to decelerate the moving speed of at least one of the workpiece and tool near a trailing end of the moving speed characteristic.

When the moving speed characteristic is set so as to decelerate the moving speed of at least one of the workpiece and tool near the trailing end of the moving speed characteristic, the moving speed is decelerated near a position corresponding to the end point in the machining form, whereby machining with a favorable accuracy can be carried out while continuing the machining. As a result, the machining time can be restrained from increasing.

BRIEF DESCRIPTION OF THE DRAWINGS

FIG. 8A is a diagram for explaining an example of operations for machining a workpiece, representing a locus of the mobile position of the workpiece (locus of its mobile position in the Z-axis direction);

FIG. 8B is a diagram for explaining an example of operations for machining a workpiece, representing a locus of the mobile position of a tool (locus of its mobile position in the X-axis direction);

FIG. 8C is a diagram for explaining an example of operations for machining a workpiece, representing a machining form of the workpiece;

BEST MODES FOR CARRYING OUT THE INVENTION

The drive control apparatus for a machine tool in accordance with an embodiment of the present invention will now be explained with reference to the drawings.

Figure 1:
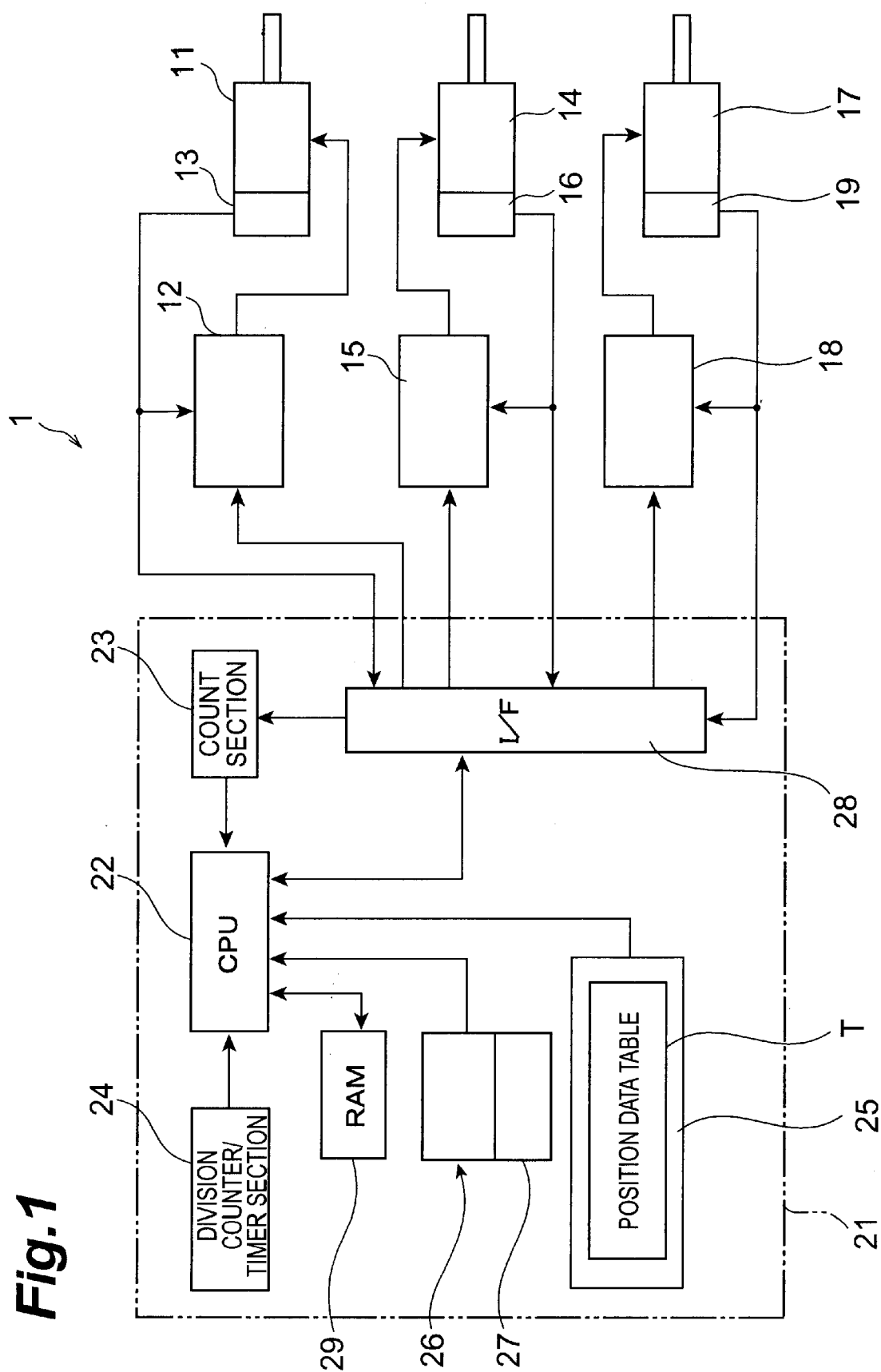
FIG. 1 is a block diagram showing a drive control apparatus for a machine tool.

As shown in FIG. 1, a machine tool 1 has a spindle rotating motor 11, a tool moving motor 14, a workpiece moving motor 17, and a control unit section 21 for controlling the driving of the individual motors 11, 14, 17. The spindle rotating motor 11 is used for rotatably driving a spindle (not depicted), which is configured so as to be able to hold a workpiece, and is connected to the control unit section 21 by way of a spindle rotating motor driving section 12. The spindle rotating motor 11 is also provided with a pulse encoder (reference timing signal generating means) 13 for detecting rotations of the spindle rotating motor 11. The output of the pulse encoder 13 is connected to the control unit section 21 and the spindle rotating motor driving section 12. Rotation detection signals outputted from the pulse encoder 13 are fed into the control unit section 21 and the spindle rotating motor driving section 12. The pulse encoder 13 generates a rotation detection signal as a reference timing signal at each predetermined rotational angle of the spindle rotating motor 11 (spindle) and outputs thus generated signal to the control unit section 21 and the spindle rotating motor driving section 12. According to spindle rotational speed command signals outputted from the control unit section 21, which will be explained later, the spindle rotating motor driving section 12 controls the power supplied to the spindle rotating motor 11. Also, as rotation detection signals are inputted from the pulse encoder 13, the spindle rotating motor driving section 12 carries out feedback control of the power supplied to the spindle rotating motor 11.

The tool moving motor 14 is used for moving a tool for machining the workpiece in a direction (X-axis direction) orthogonal to a center axis of rotation (predetermined axis) of the spindle rotating motor 11 (spindle), for example, and is connected to the control unit section 21 by way of a tool moving motor driving section 15. The tool moving motor 14 is also provided with a pulse encoder 16 for detecting rotations of the tool moving motor 14. The output of the pulse encoder 16 is connected to the control unit section 21 and the tool moving motor driving section 15. Rotation detection signals outputted from the pulse encoder 16 are fed into the control unit section 21 and the tool moving motor driving section 15. The pulse encoder 16 generates a rotation detection signal at each predetermined rotational angle of the tool moving motor 14 and outputs thus generated signal to the control unit section 21 and the tool moving motor driving section 15. According to tool position command signals outputted from the control unit section 21, which will be explained later, the tool moving motor driving section 15 controls the power supplied to the tool moving motor 14. Also, the tool moving motor driving section 15 is configured so as to carry out feedback control of the power supplied to the tool moving motor 14 as rotation detection signals are inputted from the pulse encoder 16. Here, the tool moving motor 14 and the tool moving motor driving section 15 constitute a drive motor section.

The workpiece moving motor 17 is used for moving the workpiece in a direction (Z-axis direction) parallel to the center axis of rotation of the spindle rotating motor 11 (spindle), for example; and is connected to the control unit section 21 by way of a workpiece moving motor driving section 18. The workpiece moving motor 17 is also provided with a pulse encoder 19 for detecting rotations of the workpiece moving motor 17. The output of the pulse encoder 19 is connected to the control unit section 21 and the workpiece moving motor driving section 18. Rotation detection signals outputted from the pulse encoder 19 are fed into the control unit section 21 and the workpiece moving motor driving section 18. The pulse encoder 19 generates a rotation detection signal at each predetermined rotational angle of the tool moving motor 14 and outputs thus generated signal to the control unit section 21 and the workpiece moving motor driving section 18. According to workpiece position command signals outputted from the control unit section 21, which will be explained later, the workpiece moving motor driving section 18 controls the power supplied to the workpiece moving motor 17. Also, the workpiece moving motor driving section 18 is configured so as to carry out feedback control of the power supplied to the workpiece moving motor 17 as the rotation detection signals are inputted from the pulse encoder 19. Here, the workpiece moving motor 17 and the workpiece moving motor driving section 18 constitute a drive motor section.

Figures 2, 3:
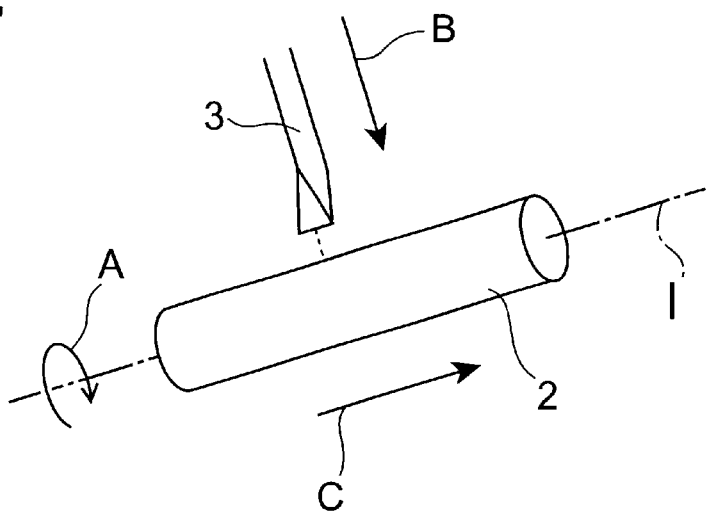
FIG. 2 is a view for explaining an example of operations for machining a workpiece in the drive control apparatus for a machine tool.
FIG. 3 is a chart for explaining a configuration of a position data table.

FIG. 2 is a view for explaining an example of machining (cutting) operations for a workpiece 2 in the machine tool 1.

As shown in FIG. 2, the workpiece 2 in a rod form is rotated about the center axis of rotation 1 (in the direction of arrow A in FIG. 2) of the spindle rotating motor 11 (spindle) by the spindle rotating motor 11. Also, the workpiece 2 is moved in a direction (the direction of arrow C in FIG. 2) parallel to the center axis of rotation 1 of the spindle rotating motor 11 by the workpiece moving motor 17. A tool 3 is moved in a direction (the direction of arrow B in FIG. 2) orthogonal to the center axis of rotation 1 by the tool moving motor 14, so as to machine the workpiece 2 into a desirable form. The machining operation for the workpiece 2 shown in FIG. 2 is effected by a so-called Swiss type machine tool. In FIG. 2, the direction of arrow B is the above-mentioned X-axis direction, whereas the direction of arrow C is the above-mentioned Z-axis direction.

As shown in FIG. 1, the control unit section 21 has a CPU (mobile position defining means) 22, a count section (reference timing signal count means) 23, a division counter/timer section 24, a position data storage section 25 as position data storage means, a ROM 26, an interface section 28, a RAM 29, and the like. The CPU 22 is an arithmetic section for carrying out signal processing of the whole control unit 21 and the like. The count section 23 is connected to the interface section 28, so that the rotation detection signals outputted from the pulse encoder 13 are fed therein by way of the interface section 28. The count section 23 counts the number of occurrences of inputted rotation detection signals. The count section 23 is also connected to the CPU 22, so that the number of occurrences of rotation detection signals outputted from the pulse encoder 13 is outputted to the CPU 22. The division counter/timer section 24 generates and outputs timing signals with a predetermined period, e.g., a period of 4 milliseconds. The timing signal shaving a period of 4 milliseconds generated in the division counter/timer section 24 are outputted to the CPU 22. Without being restricted to 4 milliseconds as mentioned above, the period of timing signals can be set appropriately in view of the processing capacity of the CPU 22, the resolution of the pulse encoder 13, performances of the motors 11, 14, 17, and the like.

In response to each of a plurality of different count values in the count values of the number of occurrences of rotation detection signals counted by the count section 23, the position data storage section 25 stores the workpiece position data indicative of the mobile position of the workpiece 2 and the tool position data indicative of the mobile position of the tool 3. The position data storage section 25 is constituted by a memory such as RAM. In the position data storage section 25, the above-mentioned workpiece position data, tool position data, and the like are stored in the form of a position data table T as shown in FIG. 3. The position data table T shown in FIG. 3 uses, instead of the count value of the number of occurrences of rotation detection signals, the number of cumulative rotations (θ) of the spindle rotating motor 11 (spindle) determined from the count value. As a matter of course, the count value itself may be used.

In the position data table T, as shown in FIG. 3, the mobile position (Zp) of the workpiece 2 as workpiece position data at the time when the number of cumulative rotations (θ) of the spindle rotating motor 11 is at a predetermined value and the mobile position (Xp) of the tool 3 as tool position data at the time when the number of cumulative rotations (θ) of the spindle rotating motor 11 is at a predetermined value are set so as to correspond to each of a plurality of different numbers of cumulative rotations (θ). For example, the mobile position (Zp) of the workpiece 2 and the mobile position (Xp) of the tool 3 are set to 1 and 2, respectively, when the number of cumulative rotations (θ) is 200.

Also set as an auxiliary operation designation in the position data table T is a moving speed characteristic of the tool 3 in a period during which the number of cumulative rotations (θ) of the spindle rotating motor 11 shifts from a predetermined value to the next predetermined value. For example, the moving speed characteristic is set such that the moving speeds of the workpiece 2 and tool 3 in a period during which the number of cumulative rotations (θ) changes in conformity to a "sine curve" characteristic which will be explained later in a period during which the number of cumulative rotations (θ) shifts from 200 to 350. As the auxiliary operation designation, rotational speed characteristics of the spindle rotating motor 11 (spindle) and the like may be set in addition to the moving speed characteristics of the workpiece 2 and tool 3 mentioned above. Also, as the auxiliary operation designation, the moving speed characteristic of the workpiece 2 and the moving speed characteristic of the tool 3 may be set separately from each other.

The position data storage section 25 is connected to the CPU 22. The mobile position (Zp) of the workpiece 2 stored in the position data storage section 25 is read out as workpiece position data by the CPU 22. The mobile position (Xp) of the tool 3 stored in the position data storage section 25 is read out as tool position data by the CPU 22.

The position data table T shown in FIG. 3 is set so as to realize a locus of the mobile position of the workpiece 2 in the Z-axis direction and a locus of the mobile position of the tool 3 in the X-axis direction, such as those shown in FIGS. 8A and 8B, for example. FIG. 8A shows the locus of the mobile position of the workpiece 2 in the Z-axis direction with respect to the number of cumulative rotations (θ) of the spindle rotating motor 11 (spindle). In a period during which the number of cumulative rotations (θ) shifts from 200 to 350, the workpiece 2 moves from a value of 1 to a value of 3. In a period during which the number of cumulative rotations (θ) shifts from 350 to 600, the workpiece 2 moves from a value of 3 to a value of 7. FIG. 8B shows the locus of the mobile position of the tool 3 in the X-axis direction with respect to the number of cumulative rotations (θ) of the spindle rotating motor 11 (spindle). In the period during which the number of cumulative rotations (θ) shifts from 200 to 350, the tool 3 is kept at a value of 2 without moving. In the period during which the number of cumulative rotations (θ) shifts from 350 to 600, the tool 3 moves from a value of 2 to a value of 4. As the workpiece 2 and the tool 3 move in conformity to the loci of mobile positions such as those mentioned above, the workpiece 2 is machined (cut) into a form such as the one shown in FIG. 8C. The area extending from point E1 to point E2 in FIG. 8C is machined in the period during which the number of cumulative rotations (θ) shifts from 200 to 350, whereas the area extending from point E2 to point E3 is machined in the period during which the number of cumulative rotations (θ) shifts from 350 to 600. In this embodiment, the rotational speed of the spindle rotating motor 11 (spindle) is held at respective predetermined constant values in the period during which the number of cumulative rotations (θ) shifts from 200 to 350 (a machining segment from point E1 to point E2) and in the period during which the number of cumulative rotations (θ) shifts from 350 to 600 (a machining segment from point E2 to point E3). Also, the rotational speed of the spindle rotating motor 11 (spindle) can be set according to the material of the workpiece 2 and the like.

In the position data table T shown in FIG. 3, the numbers of cumulative rotations (θ) of the spindle rotating motor 11 (spindle) in which the mobile position (Zp) of the workpiece 2 and the mobile position (Xp) of the tool 3 are set are the numbers of cumulative rotations (θ) corresponding to positions (E1, E2, E3, and the like) where a machining form is changed such as a point of inflexion, a corner part, and a curvature changing point in the machining form as shown in FIG. 8C, and the mobile position (Zp) of the workpiece 2 and the mobile position (Xp) of the tool 3 are defined so as to represent the mobile positions at positions (E1, E2, E3, and the like) where the machining form is changed as mentioned above. Consequently, the linear part in the machining form of the workpiece 2 is restrained from being divided, whereby a position where a machining form is changed such as a point of inflexion, a corner part, and a curvature changing point in the machining form is set as a start or end point. As a result, the storage capacity for workpiece position data and tool position data in the position data storage section 25 can be cut down more greatly.

The ROM 26 is a storage section for storing various kinds of processing programs, and partly constitutes a moving speed characteristic storage section (moving speed characteristic storage means) 27 in which the moving speed characteristics of the workpiece 2 and tool 3 are stored. A plurality of moving speed characteristics such as those shown in FIGS. 4A to 6B are stored in the form of data table or functional expression in the moving speed characteristic storage section 27. The moving speed characteristic storage section 27 (ROM 26) is connected to the CPU 22. The moving speed characteristics stored in the moving speed characteristic storage section 27 are read into the CPU 22.

Figure 4A:
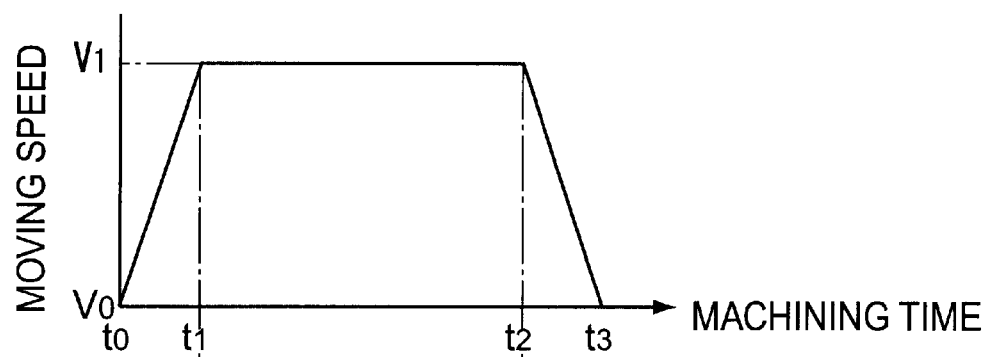
FIG. 4A is a diagram for explaining an example of moving speed characteristics, representing a relationship between the machining time and the moving speed.
Figure 4B:
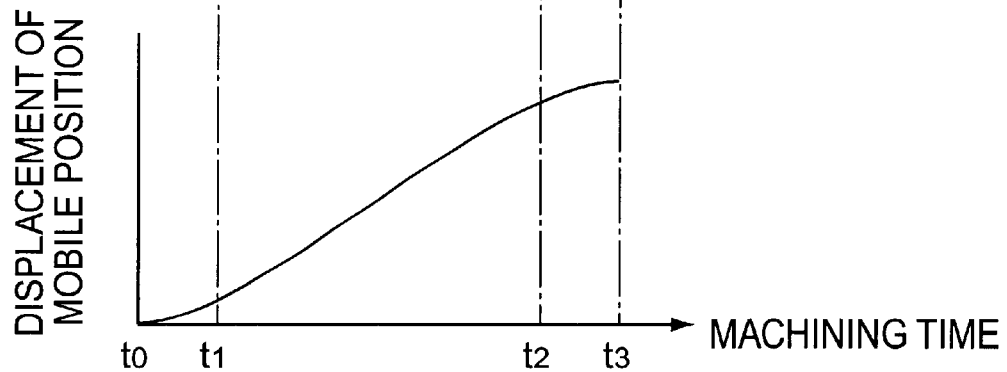
FIG. 4B is a diagram for explaining an example of moving speed characteristics, representing a relationship between the machining time and the displacement of the mobile position.

First, the "sine curve" characteristic, which is one of moving speed characteristics, will be explained with reference to FIGS. 4A and 4B. The"sine curve" characteristic has a relationship between the machining time and moving speed such as the one shown in FIG. 4A. The segment where the machining time shifts from t0 to t1 is set as an accelerating segment such that the moving speed of the workpiece 2 or tool 3 increases from V0 to V1. The segment where the machining time shifts from t1 to t2 is set as a constant speed segment such that the moving speed of the workpiece 2 or tool 3 is held constant at V1. The segment where the machining time shifts from t2 to t3 is set as a decelerating segment such that the moving speed of the workpiece 2 or tool 3 decreases from V1 to V0. Each of the time width in the accelerating segment from t0 to t1 and the time width in the decelerating segment from t2 to t3 is set so as to become ⅛ of the time width of the segment from t0 to t3. When the moving speed of the workpiece 2 or tool 3 is controlled according to the "sine curve" characteristic shown in FIG. 4A, the mobile position of the workpiece 2 or tool 3 is displaced as shown in FIG. 4B. FIG. 4B is a diagram showing a relationship between the machining time and the displacement of the mobile position. The above-mentioned "sine curve" characteristic is suitable as a moving speed characteristic in the case where a predetermined machining segment is machined rapidly. When the segment from t2 to t3, which is located near the trailing end of the moving speed characteristic, is set as a decelerating segment such that the moving speed of the workpiece 2 or tool 3 is decelerated, the moving speed is decelerated in the vicinity of the mobile position corresponding to the end point in a predetermined machining segment. As a result, accurate machining can be carried out while keeping the machining, whereby the machining time can be restrained from increasing.

Figure 5A:
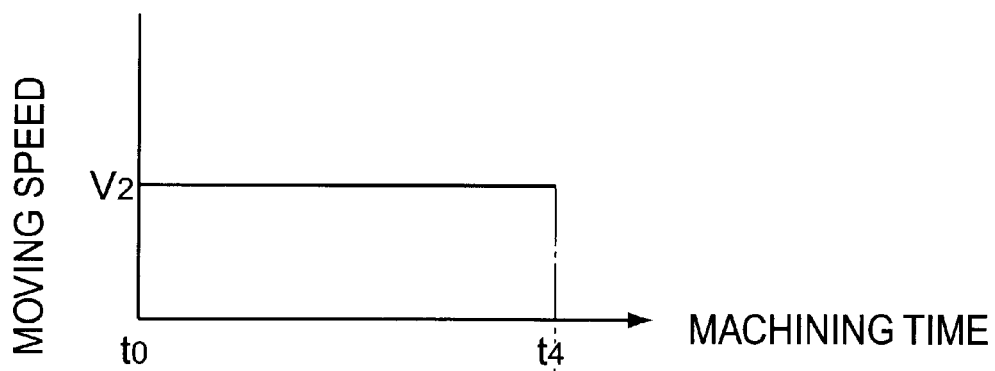
FIG. 5A is a diagram for explaining an example of moving speed characteristics, representing a relationship between the machining time and the moving speed.
Figure 5B:
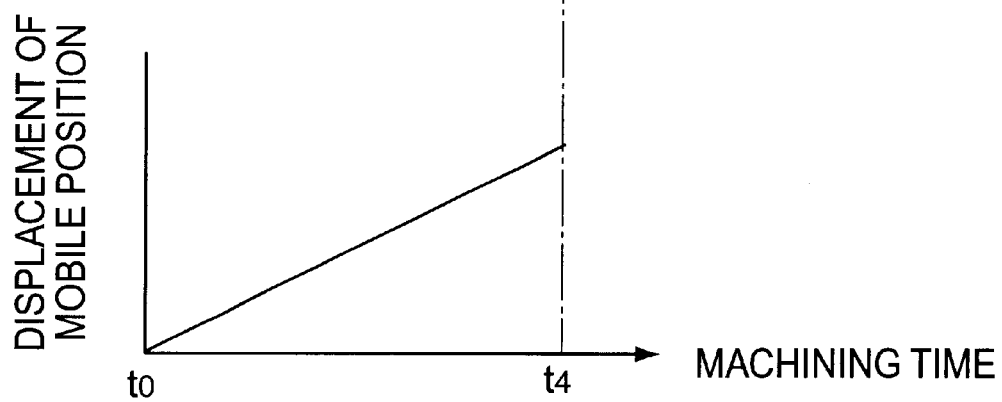
FIG. 5B is a diagram for explaining an example of moving speed characteristics, representing a relationship between the machining time and the displacement of the mobile position.

A "constant speed curve" characteristic, which is one of moving speed characteristics, will now be explained with reference to FIGS. 5A and 5B. The "constant speed curve" characteristic has a relationship between the machining time and moving speed such as the one shown in FIG. 5A. The segment where the machining time shifts from t0 to t4 is set as a constant speed segment where the moving speed of the workpiece 2 or tool 3 is held constant at V2. When the moving speed of the workpiece 2 or tool 3 is controlled in conformity to the "constant speed curve" characteristic shown in FIG. 5A, the mobile position of the workpiece 2 or tool 3 is displaced as shown in FIG. 5B. As with FIG. 4B, FIG. 5B is a diagram showing a relationship between the machining time and the displacement of the mobile position.

Figure 6A:
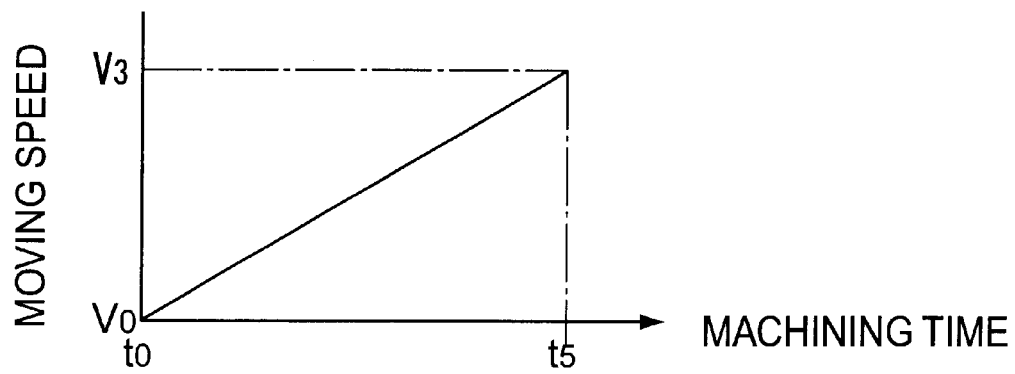
FIG. 6A is a diagram for explaining an example of moving speed characteristics, representing a relationship between the machining time and the moving speed.
Figure 6B:
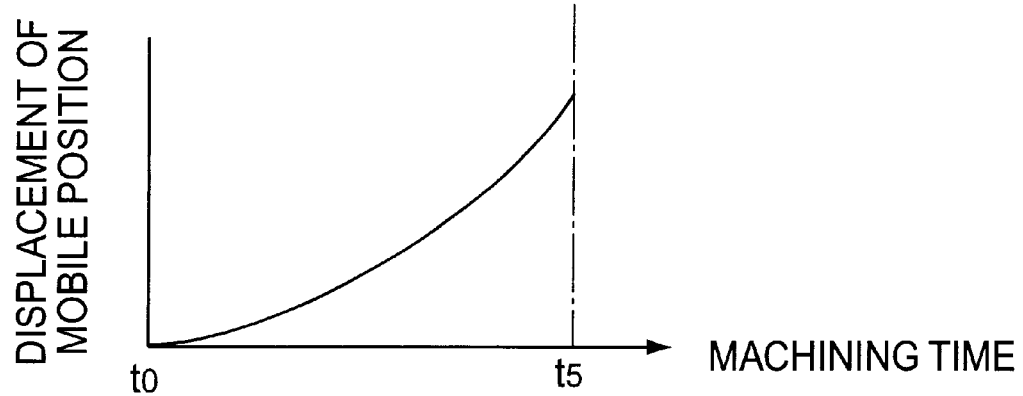
FIG. 6B is a diagram for explaining an example of moving speed characteristics, representing a relationship between the machining time and the displacement of the mobile position.

Finally, a "constant acceleration curve" characteristic, which is one of moving speed characteristics, will be explained with reference to FIGS. 6A and 6B. The "constant acceleration curve" characteristic has a relationship between the machining time and moving speed such as the one shown in FIG. 6A. The segment where the machining time shifts from t0 to t5 is set as an accelerating segment such that the moving speed of the workpiece 2 or tool 3 increases from V0 to V3. When the moving speed of the workpiece 2 or tool 3 is controlled in conformity to the "constant speed curve" characteristic shown in FIG. 6A, the mobile position of the workpiece 2 or tool 3 is displaced as shown in FIG. 6B. As with FIG. 4B or 5B, FIG. 6B is a diagram showing a relationship between the machining time and the displacement of the mobile position. In the case where the outer diameter of the workpiece rotating at a constant speed gradually increases at the machining (cutting) position, the circumferential speed of the workpiece 2 also increases. When the moving speed of the tool 3 is constant, the relative moving speed of the workpiece 2 with respect to the tool 3 increases, whereby the machining (cutting) speed effected by the tool 3 changes. In the case where the outer diameter of the workpiece 2 at the machining (cutting) position changes as such, the moving speed of the tool 3 maybe controlled in conformity to the "constant acceleration curve" characteristic matching the change in outer diameter, i.e., the moving speed of the tool 3 may be slowed down in response to the fact that the machining (cutting) speed decreases toward the center of the workpiece 2, whereby the machining can be kept favorably.

Here, the above-mentioned machining times t1, t2, t3, t4, t5 and moving speeds V1, V2, V3 are set appropriately according to the material and machining of the workpiece 2, the type of the tool 3, the type of machining, and the like.

The interface section 28 is a signal input/output section for outputting a workpiece position command signal indicative of the mobile position of the workpiece 2 defined by the CPU 22, as will be explained later, to the workpiece moving motor driving section 18. Also, the interface section 28 is a signal input/output section for outputting a tool position command signal indicative of the mobile position of the tool 3 defined by the CPU 22 to the tool moving motor driving section 15. Further, the interface section 28 is a signal input/output section for outputting a spindle rotational speed command signal indicative of the rotational speed of the spindle defined by the CPU 22 to the spindle rotating motor driving section 12, and is also a signal input/output section for feeding rotation detection signals outputted from the individual pulse encoders 13, 16, 19 into the CPU 22 and the count section 23. The RAM 29 temporarily stores results of various arithmetic operations in the CPU 22 such that they can be read out.

Figure 7:
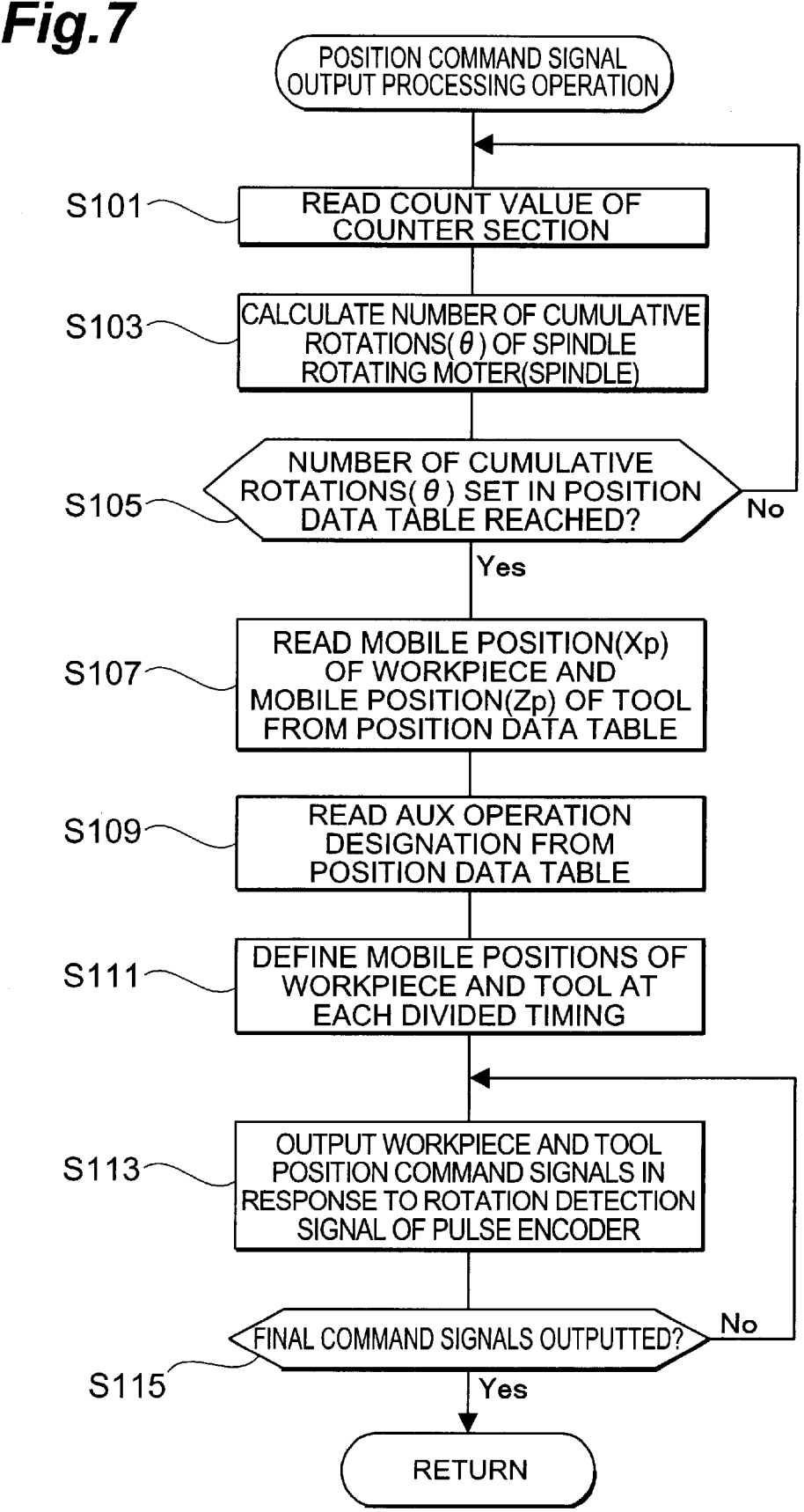
FIG. 7 is a flowchart for explaining the output operation machining for tool and workpiece position command signals in a control unit section.

With reference to FIG. 7, output processing operations for tool and workpiece position command signals in the CPU 22 (control unit section 21) will now be explained. Here, other processing operations such as the output processing operation for spindle rotational speed command signals are similar to those in known conventional machine tools and will not be explained.

Initially, at S101, the CPU 22 reads out the count value of the number of occurrences of rotation detection signals outputted from the pulse encoder 13 in the count section 23. Subsequently, the CPU 22 calculates the number of cumulative rotations (θ) of the spindle rotating motor 11 (spindle) from the read-out count value at S103, and proceeds to S105. At S105, it is determined whether the calculated number of cumulative rotations (θ) has reached the number of cumulative rotations (θ) set in the position data table T or not. If the calculated number of cumulative rotations (θ) has reached the number of cumulative rotations (θ) set in the position data table T ("Yes" at S105), then the flow shifts to S107. If the calculated number of cumulative rotations (θ) has not reached the number of cumulative rotations (θ) set in the position data table T ("No" at S105), then the flow returns to S101.

At S107, from the position data table T, the CPU 22 reads out the mobile position (Zp) of the workpiece 2 and the mobile position (Xp) of the tool 3 at the reached number of cumulative rotations (θ), and the mobile position (Zp) of the workpiece 2 and the mobile position (Xp) of the tool 3 at the next number of cumulative rotations (θ) to reach. Subsequently, at S109, the CPU 22 reads out the moving speed characteristic for the period from the reached number of cumulative rotations (θ) to the next number of cumulative rotations (θ) to reach, which is set by the auxiliary operation designation in the position data table T. Then, the CPU 22 reads out the corresponding moving speed characteristic from the moving speed characteristic storage section 27 (ROM 26). For example, when the number of cumulative rotations (θ) has reached 200 in the position data table T shown in FIG. 3, "1" and "2" are readout as the mobile position (Zp) of the workpiece 2 and the mobile position (Xp) of the tool 3, respectively. Since the next number of cumulative rotations (θ) to reach is set to 350, "3" and "2" are readout as the mobile position (Zp) of the workpiece 2 and the mobile position (Xp) of the tool 3, respectively. Further, as the moving speed characteristic of the workpiece 2 and tool 3 in the period during which the number of cumulative rotations (θ) shifts from 200 to 350, a "sine curve" characteristic is also read out.

After the mobile position (Zp) of the workpiece 2, the mobile position (Xp) of the tool 3, and the moving speed characteristic are read out at S107 and S109, the flow proceeds to S111, where the CPU 22 defines the mobile positions of the workpiece 2 and tool 3 at each predetermined divided timing. The mobile position of the workpiece 2 is defined as follows. While assuming the mobile position (Zp) of the workpiece 2 at the reached number of cumulative rotations (θ) to be a start point, and the mobile position (Zp) of the workpiece 2 at the next number of cumulative rotations (θ) to reach to be an end point, the mobile position of the workpiece 2 is defined at each divided timing having a period of 4 milliseconds according to a timing signal generated by the division counter/timer section 24 such that the mobile position of the workpiece 2 is displaced according to the moving speed characteristic set in the position data table T between the start and the end points, and thus defined position is temporarily stored into the RAM 29. For example, in the position data table T shown in FIG. 3, assuming the start point to be at 3 where the mobile position (Zp) of the workpiece 2 is located when the number of cumulative rotations (θ) is at 350, and the end point to be at 7 where the mobile position (Zp) of the workpiece 2 is located when the number of cumulative rotations (θ) is at 600, the mobile position of the workpiece 2 is defined at each divided timing having a period of 4 milliseconds such that the workpiece 2 moves in conformity to the "constant speed curve" characteristic shown in FIGS. 5A and 5B from 3 to 7.

The mobile position of the tool 3 is defined as follows. While assuming the mobile position (Xp) of the tool 3 at the reached number of cumulative rotations (θ) to be a start point, and the mobile position (Xp) of the tool 3 at the next number of cumulative rotations (θ) to reach to be an end point, the mobile position of the tool 3 is defined at each divided timing having a period of 4 milliseconds according to a timing signal generated by the division counter/timer section 24 such that the mobile position of the tool 3 is displaced according to the moving speed characteristic set in the position data table T between the start and end points. For example, in the position data table T shown in FIG. 3, assuming the start point to be at 2 where the mobile position (Xp) of the tool 3 is located when the number of cumulative rotations (θ) is at 350, and the end point to be at 4 where the mobile position (Xp) of the tool 3 is located when the number of cumulative rotations (θ) is at 600, the mobile position of the tool 3 is defined at each divided timing having a period of 4 milliseconds such that the tool 3 moves in conformity to the "constant speed curve" characteristic shown in FIGS. 5A and 5B from 2 to 4.

After the mobile positions of the workpiece 2 and tool 3 at each divided timing having a period of 4 milliseconds are defined and stored into the RAM 29, the flow shifts to S113, where the CPU 22 outputs to the workpiece moving motor driving section 18 a workpiece position command signal indicative of the mobile position of the workpiece 2 defined and stored in the RAM 29. Also, the CPU 22 outputs to the tool moving motor driving section 15 a tool position command signal indicative of the mobile position of the tool 3 defined and stored in the RAM 29. The workpiece and tool position command signals are outputted in response to the rotation detection signal outputted from the pulse encoder 13. Specifically, it is determined according to the rotation detection signal outputted from the pulse encoder 13 whether the rotational angle of the spindle rotating motor 11 (spindle) has reached the rotational angle of the spindle rotating motor 11 (spindle) during 4 milliseconds in the case where the rotating speed of the spindle rotating motor 11 (spindle) is constant. If the rotational angle of the spindle rotating motor 11 (spindle) has reached the rotational angle of the spindle rotating motor 11 (spindle) during 4 milliseconds, then the workpiece and the tool position command signals are outputted.

Thereafter, at S115, it is determined whether the workpiece position command signal and tool position command signal corresponding to the final mobile positions of the workpiece 2 and tool 3 among those defined at S111 are outputted. If the workpiece and tool position command signals corresponding to the final mobile positions are not outputted ("No" at S115), then the flow returns to S113, whereby the workpiece and tool position command signals are sequentially outputted each time the rotational angle of the spindle rotating motor 11 (spindle) reaches the rotational angle of the spindle rotating motor 11 (spindle) during 4 milliseconds. If the workpiece and tool position command signals corresponding to the final mobile positions are outputted ("Yes" at S115), then the flow returns to S101.

Thus, according to this embodiment, the machine tool 1 is equipped with the pulse encoder 13, whereas the control unit section 21 comprises the count section 23, the position data storage section 25, the moving speed characteristic storage section 27 (ROM 26), and the CPU 22 as the mobile position defining means. In particular, each time the number of cumulative rotations (θ) of the spindle rotating motor 11 (spindle) calculated according to the rotation detection signals of the pulse encoder 13 counted by the count section 23 reaches the number of cumulative rotations (θ) set in the position data table T in the position data storage section 25, the CPU 22 reads out the mobile position (Zp) of the workpiece 2 and the mobile position (Xp) of the tool 3 from the position data storage section 25 (position data table T) as position data corresponding to the reached number of cumulative rotations (θ) and the next number of cumulative rotations (θ) to reach. Also, the CPU 22 reads out the moving speed characteristic between the reached number of cumulative rotations (θ) and the next number of cumulative rotations (θ) to reach from the moving speed characteristic storage section 27 according to the auxiliary operation designation in the position data table T. Thereafter, assuming the reached number of cumulative rotations (θ) to be a start point and the next number of cumulative rotations (θ) to reach to be an end point, the CPU 22 divides the part between the start and end points into predetermined timings, and defines the mobile positions of the workpiece 2 and tool 3 at each of the divided timings according to the read-out mobile position (Zp) of the workpiece 2, mobile position (Xp) of the tool 3, and moving speed characteristic, whereby the machining form corresponding to the part between the start point (the reached number of cumulative rotations (θ)) and the end point (the next number of cumulative rotations (θ) to reach) is approximated as a linear segment.

Consequently, it is sufficient for the position data storage section 25 (position data table T) to store the mobile position (Zp) of the workpiece 2 and the mobile position (Xp) of the tool 3 corresponding to the above-mentioned start and end points, thus making it unnecessary to store all of a lot of position data concerning the machining form. As a result, the storage capacity for position data in the position data storage means can be cut down greatly. Also, since the mobile position (Zp) of the workpiece 2 and the mobile position (Xp) of the tool 3 as position data indicative of the mobile positions of the workpiece 2 and tool 3 are stored in the position data storage section (position data table T), arithmetic operations for taking account of link mechanisms, length adjustment mechanisms, and the like become unnecessary. As a result, the mobile positions of the workpiece 2 and tool 3 at each of the divided timings can be defined rapidly.

Further, the machining form corresponding to the part between the start and end points is approximated as a linear segment, and the moving speeds of the workpiece 2 and tool 3 within this linear segment are controlled according to the moving speed characteristic stored in the moving speed characteristic storage section 27 (ROM 26). As a result, when machining a portion corresponding to the part between the start and end points of the workpiece 2, the moving speeds of the workpiece 2 and tool 3 can be changed appropriately according to the moving speed characteristic, whereby the accuracy in machining the workpiece 2 with the tool 3 can be improved.

Also, when it is determined according to the rotation detection signal outputted from the pulse encoder 13 that the rotational angle of the spindle rotating motor 11 (spindle) has reached the rotational angle of the spindle rotating motor 11 (spindle) during 4 milliseconds, the CPU 22 outputs the defined mobile positions of the workpiece 2 and tool 3 as the workpiece and tool position command signals as command data to the workpiece moving motor driving section 18 and the tool moving motor driving section 15, whereby the workpiece and tool position command signals are sequentially outputted to their corresponding motor driving sections in response to the rotation of the spindle rotating motor 11 (spindle). Consequently, even in the case where the rotation of the spindle rotating motor 11 (spindle) is fluctuated, the mobile positions of the workpiece 2 and tool 3 defined in the state additionally taking account of the fluctuation in rotation are outputted as the workpiece and tool position command signals to the workpiece moving motor driving section 18 and tool moving motor driving section 15, respectively. As a result, the accuracy in machining the workpiece 2 with the tool 3 can further be improved.

A modified example of output machining operations for tool and workpiece position command signals in the CPU 22 (control unit section 21) will now be explained with reference to FIG. 9. The output processing operation shown in FIG. 7 and the modified example shown in FIG. 9 differ from each other in terms of how the tool and workpiece position command signals are outputted.

Initially, at S201, the CPU 22 reads out the count value of the number of occurrences of rotation detection signals outputted from the pulse encoder 13 in the count section 23. Subsequently, the CPU 22 calculates the number of cumulative rotations (θ) of the spindle rotating motor 11 (spindle) from the read-out count value at S203, and proceeds to S205. At S205, it is determined whether the calculated number of cumulative rotations (θ) has reached the number of cumulative rotations (θ) set in the position data table T. If the calculated number of cumulative rotations (θ) has reached the number of cumulative rotations (θ) set in the position data table T ("Yes" at S205), then the flow shifts to S207. If the calculated number of cumulative rotations (θ) has not reached the number of cumulative rotations (θ) set in the position data table T ("No" at S205), then the flow returns to S201.

At S207, from the position data table T, the CPU 22 reads out the mobile position (Zp) of the workpiece 2 and the mobile position (Xp) of the tool 3 at the reached number of cumulative rotations (θ), and the mobile position (Zp) of the workpiece 2 and the mobile position (Xp) of the tool 3 at the next number of cumulative rotations (θ) to reach. Subsequently, at S209, the CPU 22 reads out the moving speed characteristic for the period from the reached number of cumulative rotations (θ) to the next number of cumulative rotations (θ) to reach, which is set by the auxiliary operation designation in the position data table T. Then, the CPU 22 reads out the corresponding moving speed characteristic from the moving speed characteristic storage section 27 (ROM 26).

After the mobile position (Zp) of the workpiece 2, the mobile position (Xp) of the tool 3, and the moving speed characteristic are read out at S207 and S209, the flow proceeds to S211, where the CPU 22 defines the mobile positions of the workpiece 2 and tool 3 at each predetermined divided timing. The mobile position of the workpiece 2 is defined as follows. While assuming the mobile position (Zp) of the workpiece 2 at the reached number of cumulative rotations (θ) to be a start point, and the mobile position (Zp) of the workpiece 2 at the next number of cumulative rotations (θ) to reach to be an end point, the mobile position of the workpiece 2 is defined at each divided timing having a period of 4 milliseconds such that the mobile position of the workpiece 2 is displaced according to the moving speed characteristic set in the position data table T between the start and end points according to a timing signal having a period of 4 milliseconds generated by and outputted from the division counter/timer section 24. Also, while assuming the mobile position (Xp) of the tool 3 at the reached number of cumulative rotations (θ) to be a start point, and the mobile position (Xp) of the tool 3 at the next number of cumulative rotations (θ) to reach to be an end point, the mobile position of the tool 3 is defined at each divided timing having a period of 4 milliseconds such that the mobile position of the tool 3 is displaced according to the moving speed characteristic set in the position data table T between the start point and the end point according to a timing signal having a period of 4 milliseconds generated by and outputted from the division counter/timer section 24. Thus defined positions are stored into the RAM 29.

After the mobile positions of the workpiece 2 and tool 3 at each divided timing having a period of 4 milliseconds are defined and stored into the RAM 29, the flow proceeds to S213, where the CPU 22 outputs to the workpiece moving motor driving section 18 a workpiece position command signal indicative of the mobile position of the workpiece 2 defined and stored in the RAM 29. Also, the CPU 22 outputs to the tool moving motor driving section 15 a tool position command signal indicative of the mobile position of the tool 3 defined and stored in the RAM 29.

Subsequently, at S215, the timer ΔT in the division counter/timer section 24 is reset to 0 millisecond; and the flow proceeds to S217. At S217, it is determined whether the workpiece and tool position command signals corresponding to the final mobile positions of the workpiece 2 and tool 3 among those defined at S211 are outputted. If the workpiece and tool position command signals corresponding to the final mobile positions are outputted ("Yes" at S217), then the flow returns to S201. If the workpiece and tool position command signals corresponding to the final mobile positions are not outputted ("No" at S217), then the flow proceeds to S219, where the clocking of the timer ΔT in the division counter/timer section 24 is started.

Subsequently, at S221, it is determined whether the timer ΔT in the division counter/timer section 24 has reached 4 milliseconds. If the timer ΔT has not reached 4 milliseconds ("No" at S221), then the flow returns so as to continue the clocking of the timer ΔT. If the timer ΔT has reached 4 milliseconds ("Yes" at S221), then the flow returns to S213, where the CPU 22 outputs to the workpiece moving motor driving section 18 a workpiece position command signal indicative of the mobile position of the workpiece 2 after the lapse of 4 milliseconds. Also, the CPU 22 outputs to the tool moving motor driving section 15 a tool position command signal indicative of the mobile position of the tool 3 after the lapse of 4 milliseconds. As a consequence, until the workpiece position and tool position command signals corresponding to the final mobile positions are outputted, workpiece and tool position command signals are sequentially outputted at a period of 4 milliseconds.

Figure 9:
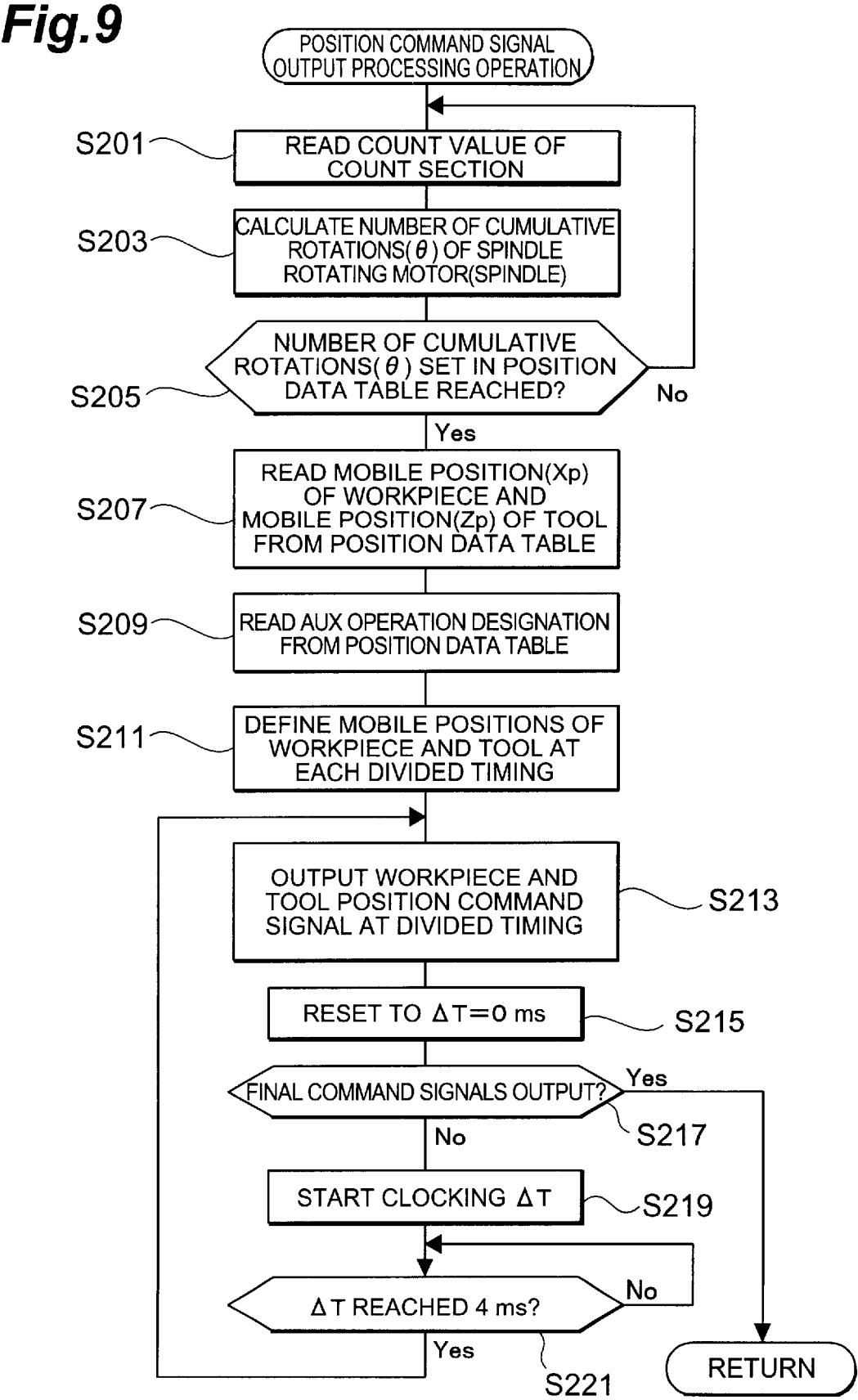
FIG. 9 is a flowchart for explaining a modified example of the output operation machining for tool and workpiece position command signals in the control unit section.

As in the above-mentioned embodiment, the modified example shown in FIG. 9 can greatly cut down the storage capacity for positional data in the position data storage means and can rapidly define the mobile positions of the workpiece 2 and tool 3 at each divided timing. Further, when machining the portion of workpiece 2 corresponding to the part between the start and end points, the moving speeds of the workpiece 2 and tool 3 can be changed appropriately according to moving speed characteristics, whereby the accuracy in machining the workpiece 2 with the tool 3 can be improved.

Also, each time the timer ΔT in the division counter/timer section 24 clocks 4 milliseconds, the CPU 22 outputs the defined mobile positions of the workpiece 2 and tool 3 as the workpiece and tool position command signals as command data to the workpiece moving motor driving section 18 and tool moving motor driving section 15, respectively, whereby the workpiece and tool position command signal are sequentially outputted to their corresponding motor driving sections at a divided timing having a period of 4 milliseconds. As a consequence, a configuration capable of outputting the defined mobile positions of the workpiece 2 and tool 3 as the workpiece and tool position command signals to their corresponding motor driving sections can be realized in a quite simple fashion.

Figure 10:
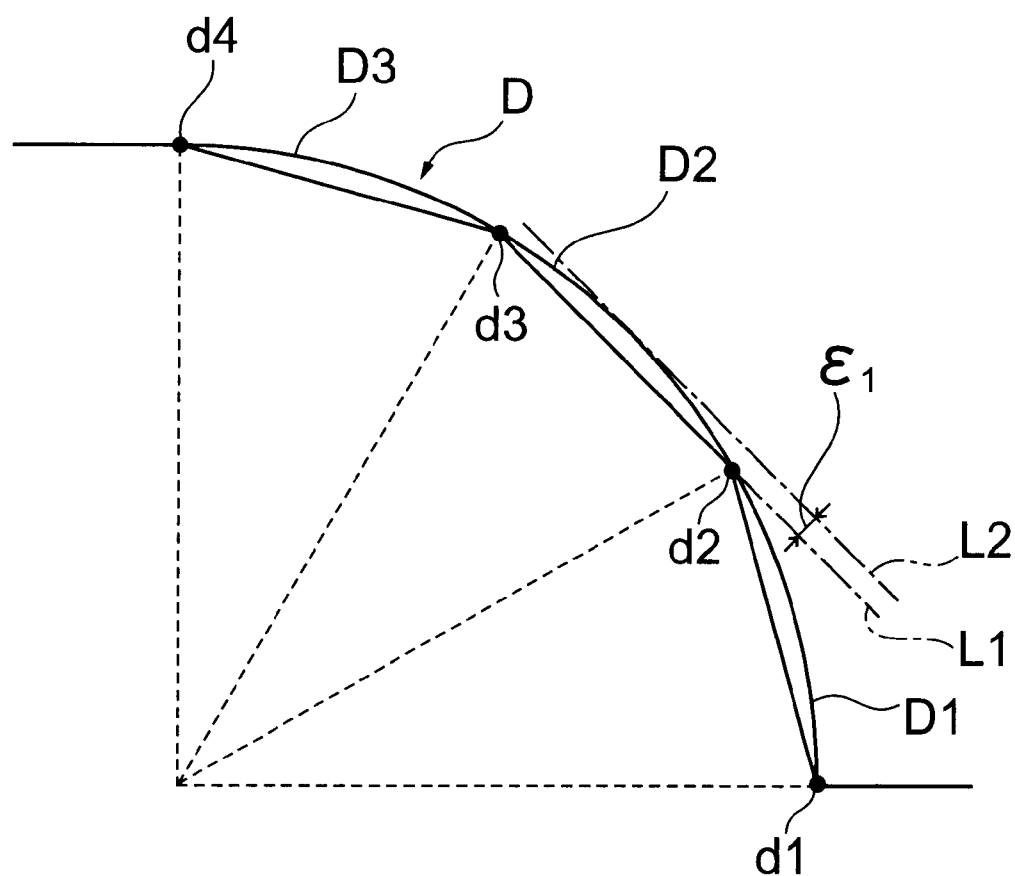
FIG. 10 is a diagram for explaining a linear approximation of a curved part in a machining form.

A linear approximation of a curved part in a machining form will now be explained with reference to FIG. 10. First, the curved part is divided by a predetermined dividing angle about the center of curvature of the curved part. In FIG. 10, a curved part D is divided into divisional curved portions D1, D2, D3. Letting L1 be the line connecting two points at both ends of a divisional curved portion, e.g., points d2 and d3 at both ends of a divisional curved portion D2, and ε1 be the distance between the line L1 and a tangent to a divisional curved portion, e.g., a tangent L2 to the divisional curved portion D2, the number of divisions of the curved part is increased so as to reduce the dividing angle when the distance ε1 is greater than a predetermined value ε0, in order for ε1 to become ε0 or smaller. The predetermined value ε0 is set according to the machining accuracy, machining time, and the like of the curved part.

In the case where a curved part such as that mentioned above exists in the machining form, the numbers of cumulative rotations (θ) of the spindle rotating motor 11 (spindle) at which the mobile position (Zp) of the workpiece 2 and the mobile position (Xp) of the tool 3 are set in the position data table T shown in FIG. 3 are defined as the numbers of cumulative rotations (θ) corresponding to divided positions where the distance between the tangent to a divisional curved portion and the line connecting two points at both ends of the divisional curved portion is at the predetermined value ε0 or smaller, e.g., those corresponding to points d1, d2, d3, d4 in FIG. 10, and the mobile positions (Zp) of the workpiece 2 and the mobile positions (Xp) of the tool 3 at the above-mentioned divided positions are set. As a consequence, even when a curved part exists in a machining form of the workpiece 2, the machining form corresponding to the part between the start and end points can be approximated as a linear segment, whereby a moving speed characteristic can be set for each divisional linear segment. As a result, the tool 3 can be restrained from deviating from its target mobile position (and thus being short of cutting, cutting in excess, and the like), whereby the workpiece 2 can be machined favorably without sacrificing the accuracy in machining even in the curved part.

Though the workpiece 2 and the tool 3 are made movable so as to define the mobile position of the workpiece 2 and the mobile position of the tool 3 in the above-mentioned embodiment, it is not restrictive. For example, the workpiece 2 may be made movable alone so as to define the mobile position of the workpiece 2. Alternatively, the tool 3 may be made movable alone so as to define the mobile position of the tool 3.

Though the above-mentioned embodiment is configured such that the control unit section 21 is provided with the count section 23 and the division counter/timer section 24, the count section 23 and the division counter/timer section 24 may be constituted by a software counter as well.

Though the above-mentioned embodiment is configured such that a part of the ROM 26 is provided with the moving speed characteristic storage section 27, it is not restrictive.

For example, the moving speed characteristic storage section 27 may be provided independently from the ROM 26, and individual moving speed characteristics may be stored into a RAM acting as the moving speed characteristic storage section 27.

In the output processing operations for tool and workpiece position command signals in the CPU 22 (control unit section 21) shown in FIG. 7 or 9, assuming the mobile position at the reached number of cumulative rotations (θ) to be a start point, and the mobile position at the next number of cumulative rotations (θ) to reach to be an end point, an arithmetic operation for defining the mobile position between the start and end points at each predetermined divided timing is carried out, and then command signals indicative of thus defined mobile positions are sequentially outputted. However, the arithmetic operation for defining the mobile position at each predetermined divided timing may be carried out a teach timing for outputting a command signal. In this case, it becomes unnecessary to store results of the arithmetic operation for defining the mobile position between the start and end points at each predetermined divided timing, which is effective in that the memory capacity of the RAM 29 can be cut down.

The above-mentioned embodiment is configured such that the control unit section 21 is provided with the division counter/timer section 24. However, assuming the mobile position at the reached number of cumulative rotations (θ) to be a start point, and the mobile position at the next number of cumulative rotations (θ) to reach to be an end point, the part between the start and end points may be divided according to rotation detection signals from the pulse encoder 13, so as to define the mobile positions of the workpiece 2 and tool 3 at each of the timings divided according to rotation detection signals from the pulse encoder 13 without providing the division counter/timer section 24.

INDUSTRIAL APPLICABILITY

The drive control apparatus for a machine tool in accordance with the present invention can be utilized for a spindle sliding type automatic lathe comprising a spindle movable in an axial direction of a rod material, and a machining tool for machining the rod material.

What is claimed is:

1. A drive control apparatus for a machine tool for machining a workpiece into a desirable form by rotating said workpiece about a predetermined axis and moving at least one of said workpiece and a tool for machining said workpiece;

said apparatus comprising:

reference timing signal generating means for generating a reference timing signal at each predetermined rotational angle in said predetermined axis;

reference timing signal count means for counting the number of occurrences of said reference timing signal;

position data storage means for storing position data respectively set so as to correspond to a plurality of different count values of said number of occurrences, said position data indicating a mobile position of at least one of said workpiece and tool;

moving speed characteristic storage means for storing a moving speed characteristic of at least one of said workpiece and tool between two points in said position data; and mobile position defining means for reading out, each time the number of occurrences of said reference timing signal counted by said reference timing signal count means reaches said count value, position data corresponding to said reached count data and a next count data to reach from said position data storage means, and a moving speed characteristic corresponding to a part between said reached count value and said next count value to reach from said moving speed characteristic storage means, dividing said part between said reached count value and said next count value to reach into predetermined timings, and defining a mobile position of at least one of said workpiece and tool at each of said divided timings according to said read-out position data and moving speed characteristic;

wherein at least one of said workpiece and tool is moved according to said mobile position defined by said mobile position defining means.

2. A drive control apparatus for a machine tool according to claim 1, wherein said machine tool comprises a drive motor section for moving said at least one of said workpiece and tool; and wherein said mobile position defining means sequentially outputs said defined mobile position as command data to said drive motor section in response to rotation of said predetermined axis.

3. A drive control apparatus for a machine tool according to claim 1, wherein said the machine tool comprises a drive motor section for moving said at least one of said workpiece and tool; and wherein said mobile position defining means sequentially outputs said defined mobile position as command data to said drive motor section at said divided timings.

4. A drive control apparatus for a machine tool according to claim 1, wherein said count value is defined such that said position data set so as to correspond to said count value represents said mobile position at a position where a machining form is changed such as a point of inflexion, a corner part, and a curvature changing point in said desirable form.

5. A drive control apparatus for a machine tool according to claim 1, wherein said count value is defined so as to represent said mobile position at a dividing position where a curved part in said desirable form is divided.

6. A drive control apparatus for a machine tool according to claim 1, wherein said moving speed characteristic is set so as to decelerate said moving speed of at least one of said workpiece and tool near a trailing end of said moving speed characteristic.

* * * * *